(12) United States Patent
Golub

(10) Patent No.: US 6,477,293 B1
(45) Date of Patent: Nov. 5, 2002

(54) MULTIPLEXER/DEMULTIPLEXER FOR WDM OPTICAL SIGNALS

(76) Inventor: Ilya Golub, 31 Castleton Street, Nepean, Ontario (CA), K2G 5P2

( * ) Notice: Subject to any disclaimer, the term of this patent is extended or adjusted under 35 U.S.C. 154(b) by 0 days.

(21) Appl. No.: 09/378,719

(22) Filed: Aug. 23, 1999

(30) Foreign Application Priority Data

Aug. 24, 1998 (CA) ............................................. 2245389

(51) Int. Cl.$^7$ ................................................ G02B 6/28

(52) U.S. Cl. ............................. 385/24; 385/15; 385/31; 385/33; 385/37; 359/124; 359/130; 359/131

(58) Field of Search .............................. 385/24, 15, 31, 385/33, 37, 47; 359/124, 129, 130, 131

(56) References Cited

U.S. PATENT DOCUMENTS

| | | | |
|---|---|---|---|
| 4,622,662 A | 11/1986 | Laude et al. .................... | 370/3 |
| 4,819,224 A | 4/1989 | Laude et al. .................... | 370/3 |
| 4,923,270 A | * 5/1990 | Carter ......................... | 359/127 |
| 4,926,412 A | 5/1990 | Jannson et al. ................. | 370/3 |
| 5,518,863 A | * 5/1996 | Pawluczyk ..................... | 430/321 |

FOREIGN PATENT DOCUMENTS

| | | | |
|---|---|---|---|
| EP | 0 859 249 | 8/1998 | ............ G02B/6/34 |
| FR | 2731573 | 9/1996 | |
| GB | 2219869 | 12/1989 | ............ G02B/6/34 |
| WO | WO-97/14066 | * 4/1997 | |

OTHER PUBLICATIONS

"An original low–loss and pass–band flattened SiO$_2$ on Si planar wavelength demultiplexer", OFC '98 Technical Digest, Feb. 1998, p. 77, G.H.B. Thompson et al.

"Broad–Passband–Width Optical Filter for Multi–Demultiplexer using a Diffraction Grating and a Retroreflector Prism", Electronics Letters, vol. 21, No. 10, May 1985, pp. 423 and 424, Isao Nishi et al.

"Broad–Passband Multi/Demultiplexer for Multimode Fibers Using a Diffraction Grating and Retroreflectors", Journal of Lightwave Technology, vol. LT–5, No. 12, Dec. 1987, pp. 1695–1700, I. Nishi et al.

(List continued on next page.)

Primary Examiner—Rodney Bovernick
Assistant Examiner—Sung Pak
(74) Attorney, Agent, or Firm—Thomas Adams

(57) ABSTRACT

In a wavelength-division multiplexer/demultiplexer of the free-space kind, which uses a diffraction grating or other angularly-dispersive element, spatially-shaping the light beam(s) to modify the passband response in the dispersion plane results in a substantially flat spectral response. Spatial shaping may be obtained using lenses disposed adjacent ports through which pass a corresponding plurality of angularly-dispersed light beams having different centre frequencies/wavelengths. Each lens may be a cylindrical lens with its cylindrical axis normal to the dispersion plane so as to shape the light beam in only one direction, i.e. that of the dispersion plane. The lenses may each be a single lens, conveniently a microlens, each adjacent a port through which WDM light beams pass. Alternatively, a plurality of microlenses may be provided adjacent the plurality of ports and a single microlens adjacent the single WDM port. The plurality of microlenses and the single microlens cooperate to provide a very small loss multiplexer/demultiplexer with a broad gaussian-type spectral response. The diffraction grating may be reflective or transmissive, and concave so as to combine the functions of a grating and a lens. The microlenses could be spherical lenses, diffractive-type elements, and so on. Other dispersive elements, such as prisms, etc., may be used instead of the diffraction grating. Reversing the light ray direction allow the demultiplexer to act as a multiplexer. One-dimensional spatial-shaping may be implemented in waveguide WDM devices.

18 Claims, 7 Drawing Sheets

OTHER PUBLICATIONS

"Narrow–band ten–channel optical multiplexer and demultiplexer using a Fourier diffraction grating", Applied Optics, vol. 31, No. 20, Jul. 20, 1992.

"16 Channel Dense Wavelength Division Multiplexer 100 GHz–Fully Bidirectional Low Loss: WDM–16/1/100 IT/S", Jobin Yvon–Spex (Horiba Group).

"16 Channel Dense Wavelength Division Multiplexer 100 GHz–Fully Bidirectional Large FWHM:WDM–16/2/100 ITU/S", Jobin Yvon–Spex (Horiba Group).

"8 Channel Dense Wavelength Division Multiplezer 200 GHz–Fully Bidirectional Large FWHM:WDM–8/2/200 ITU/S", Jobin Yvon–Spex (Horiba Group).

"8 Channel Dense Wavelength Division Multiplexer 200 GHz–Fully Bidirectional Low Loss:WDM–8/1/200 ITU/S", Jobin Yvon–Spex (Horiba Group).

"Diffraction Gratings Stretch Fiber's Capacity", Jean–Pierre Laude, Kevin Liddane and Steve Slutter, Photonics Spectra, Feb. 1996, Laurin Publishing Co., Inc.

Channel WDM Multiplexer with 1nm Channel Spacing and 0.7nm Bandwidth D.R. Wisely, Electronic Letter Mar. 14, 1991, vol. 27 No. 6.

* cited by examiner

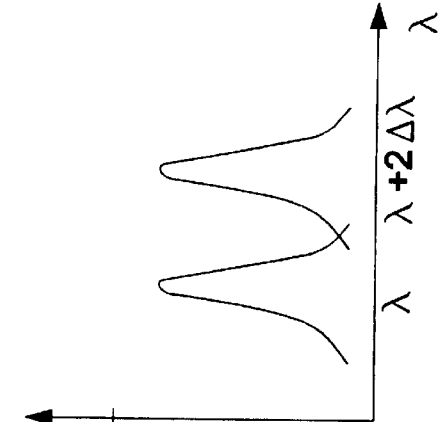
FIG. 4D
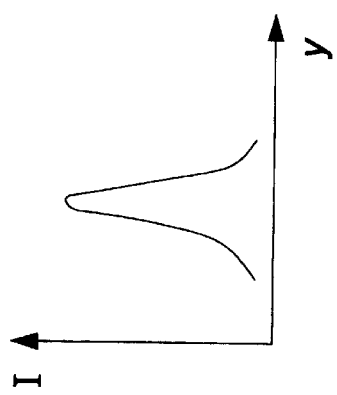
FIG. 4C
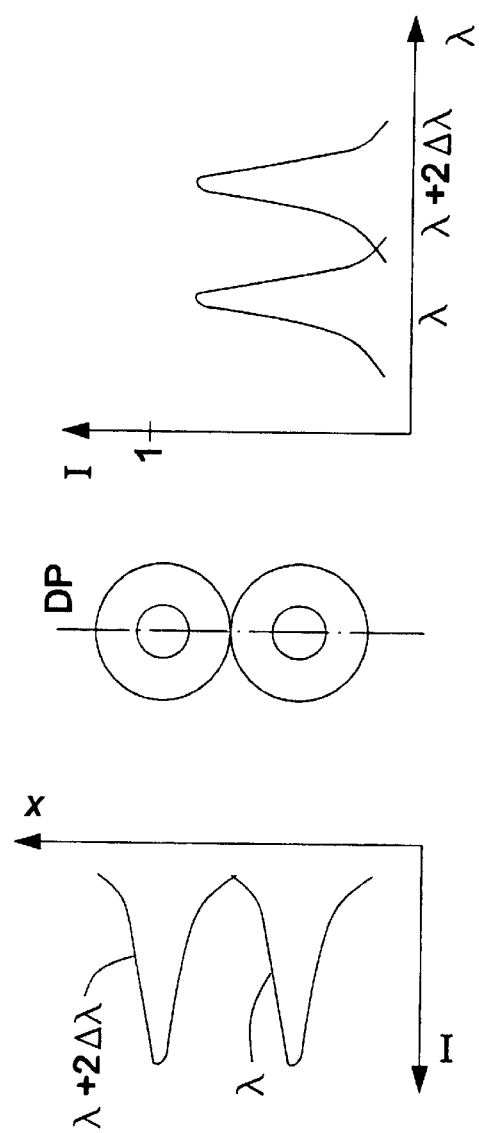
FIG. 4A
FIG. 4B
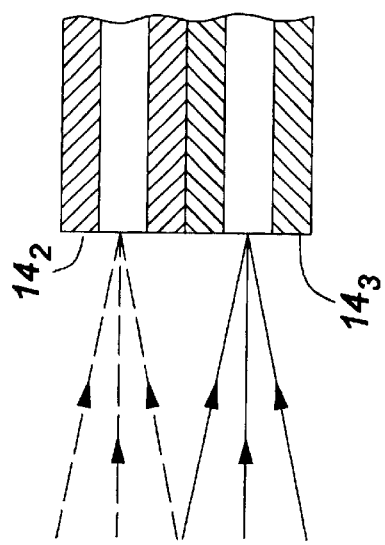
FIG. 3

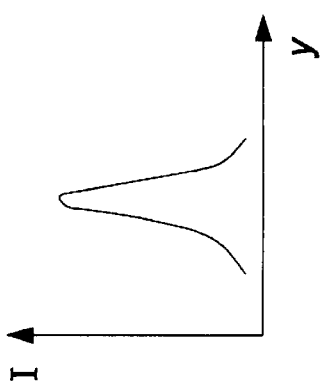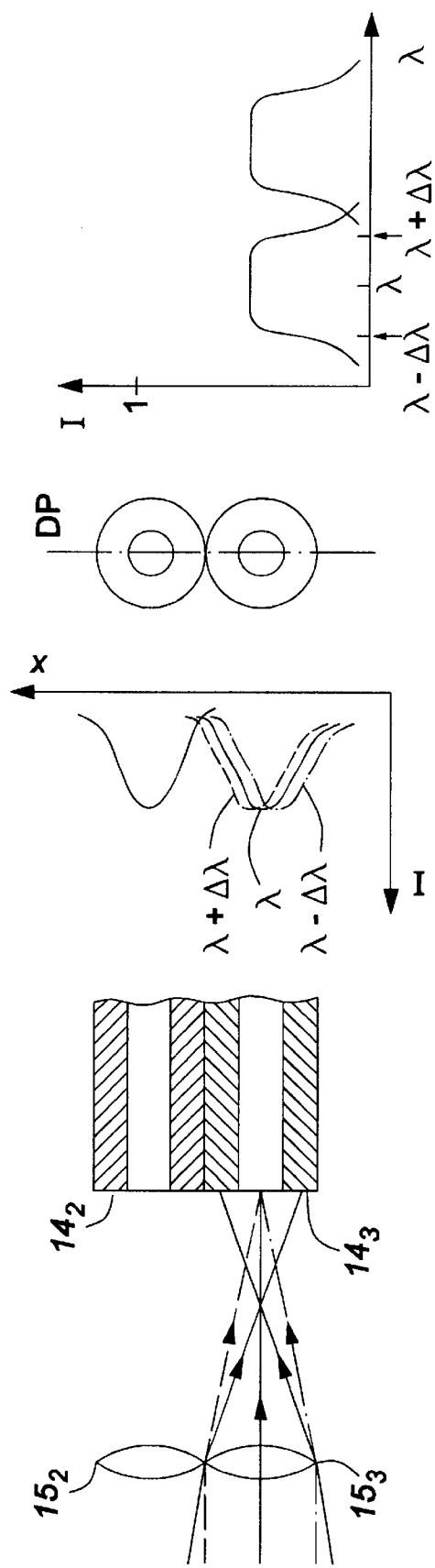

MULTIPLEXER/DEMULTIPLEXER FOR WDM OPTICAL SIGNALS

TECHNICAL FIELD

The invention relates to optical devices and in particular to devices for wavelength-division multiplexing of optical signals and/or demultiplexing such multiplexed signals. The invention is especially, but not exclusively, applicable to so-called "free space" multiplexer/demultiplexer devices in which the light beams traversing the device are not guided.

BACKGROUND ART

Increasingly, optical communications systems use wavelength division multiplexing (WDM) to increase capacity by transmitting data at several different wavelengths, simultaneously, via the same communications channel, for example via the same optical fiber. Such increased capacity results in lower optical fiber requirements and allows existing systems to be upgraded to handle increases in data traffic.

In order to implement WDM, optical transmission systems require a multiplexer for multiplexing several signals having different wavelengths to form a single WDM signal for transmission, and a demultiplexer for demultiplexing the WDM signal to extract the original signals having different wavelengths. The multiplexer and the demultiplexer may be identical devices, but with light traversing them in opposite directions.

The invention is concerned especially with multiplexers/demultiplexers which use an angularly-dispersive element, such as a diffraction grating. Examples of such devices are disclosed in U.S. Pat. No. 4,622,662 (Laude et al.), U.S. Pat. No. 4,819,224 (Laude et al.), U.S. Pat. No. 4,926,412 (Jannson et al.), and French patent document No. 2,731,573 (Laude). Such devices include a diffraction grating, a collimator lens and an array of optical waveguides, specifically fibers. When the device is used as a demultiplexer, the input WDM light beam is collimated and then separated by the diffraction grating into a plurality of light beams having different wavelengths and the collimator lens focuses each light beam onto a respective one of the output fibers.

In WDM systems, the intensity of the transmitted/received signals may vary as a result of relative shift of the signal wavelength and the gaussian-type shape of the spectral response of the multiplexer/demultiplexer. Another problem due to the shoulders/wings of the gaussian-type spectral response not being steep enough is an associated overlapping between signals in adjacent communications channels resulting in cross-talk, i.e. poor isolation. These problems can be ameliorated by making the spectral response of the multiplexer/demultiplexer relatively flat, so that variations in the signal wavelength are less likely to affect intensity. It is desirable, therefore, to obtain a spectral response which comprises a substantially flat passband with sharply rising edges/steep shoulders. Such flattening could be obtained by making the optical source spatially wider than the output waveguides, but this would increase transmission loss because each waveguide would intercept only a small portion of the associated light beam.

In an article entitled "An original low-loss and pass-band flattened $SiO_2$ on Si planar wavelength demultiplexer", OFC '98 Technical Digest, February 1998, page 77, G. H. B. Thompson et al. proposed instead to use two waveguide arrays with equal diffraction efficiency arranged in tandem, with the image of the first array forming the source for the second array. Such a waveguide array multiplexer/demultiplexer would have a flat-topped response and so be less likely to suffer from poor isolation between channels. However, it would still suffer from high losses and require active temperature stabilization.

The spectral response of a wavelength-division multiplexer using a single grating resembles the response shape of coupling loss as a function of offset between two fibers. This is a convolution between two gaussians, i.e. it is itself a gaussian function. The ratio of channel passband width to spacing can be increased, and the spectral response flattened, by using an even number of gratings in order to cancel out the linear dispersion at the output fiber. This can be done with one grating and an array of retroreflectors shifted one relative to another in a plane perpendicular to the grating's dispersion plane. Such an approach to flattening the response characteristic of a multiplexer/demultiplexer of the "free space" kind was disclosed by Isao Nishi et al. in a first article entitled "Broad-Passband-Width Optical Filter for Multi/Demultiplexer using a Diffraction Grating and a Retroreflector Prism", Electronics Letters, Vol. 21, No. 10, May 1985, pp. 423 and 424, and in a second article entitled "Broad Passband Multi/Demultiplexer for Multimode Fibers Using a Diffraction Grating and Retroreflectors", Journal of Lightwave Technology, Vol. LT-5, No. 12, December 1987, pp. 1695–1700. In Nishi et al.'s device, the retroreflectors are placed where usually the output fiber array would be positioned. Input WDM light is diffracted a first time by the diffraction grating, reflected by the retroreflector back to the diffraction grating where it is diffracted a second time, and then focused onto the output fiber array. This arrangement is not entirely satisfactory for several reasons. In particular, passing the light through the diffraction grating twice may increase polarization-dependent loss. Also, although Nishi et al.'s device might be suitable for multimode fiber arrays and relatively broad bandwidths, there is an increasing demand for narrower bandwidths and single mode fiber arrays. The smaller dimensions involved may lead to difficulties in making very small retroreflectors and aligning them precisely. For example, Nishi et al. described a two channel wavelength division multiplexer with 100 nm channel spacing using two retroreflectors, each with base width $W=250\mu$, and length $L=100\mu$, with a lateral offset of $62\mu$ between the retroreflectors. The retroreflectors were separate elements assembled and glued individually. Increasing the number of channels to, say, eight, with a spacing of 1.6 nm, for example, would require retroreflectors with width and length approximately equal to $150\mu$ and $50\mu$, respectively, and a shift of about $10\mu$ between them. Manufacture of these elements, and their assembly in a WDM device, would pose major technological problems.

An object of the present invention is to ameliorate the disadvantages of the above-described devices.

SUMMARY OF THE INVENTION

According to the present invention, there is provided a multiplexer/demultiplexer device for multiplexing a plurality of light beams communicated via a corresponding plurality of ports to form a wavelength-division-multiplexed (WDM) light beam, each of said plurality of light beams comprising a distinct group of wavelengths, the groups having different centre wavelengths, and for demultiplexing such a wavelength-division-multiplexed (WDM) light beam to form the corresponding plurality of light beams. The multiplexer/demultiplexer comprises:

(i) angular dispersion means for dispersing a said WDM light beam incident thereupon along a predetermined optical path into said plurality of light beams, each at a corresponding one of a plurality of dispersion angles in a dispersion plane of the angular dispersion means, or combining a plurality of light beams incident thereupon each at a corresponding one of said plurality of dispersion angles to form a said WDM light beam in said optical path, (ii) a WDM port disposed in said optical path for communicating said WDM light beam to or from said angular dispersion means;

(iii) a plurality of ports disposed in said dispersion plane and so positioned relative to said angular dispersion means as to define a corresponding plurality of optical paths for communicating said plurality of light beams between said angular dispersion means and respective ones of said plurality of ports; and (iv) optics means for spatially-modifying said WDM light beam, or said WDM light beam and each of said plurality of light beams, or each of said plurality of light beams, by refocusing light beam components whose wavelengths are at extremes of the range about the centre wavelengths and defocusing light beam components whose wavelengths are closer to the centre wavelengths so as to achieve a spectral intensity across each port that is substantially flat.

The angular dispersion means may comprise a diffraction grating.

In one preferred embodiment of the invention, the angular dispersion means comprises a diffraction grating and a collimating lens disposed between the diffraction grating and the WDM port for collimating light leaving the WDM port before the light is incident upon the diffraction grating, or conversely focusing a light beam leaving the diffraction grating onto the associated port.

The optics means may comprise a plurality of lens elements, such as microlenses, each for spatially-shaping a respective one of said plurality of light beams and associated with a respective one of the plurality of ports.

Alternatively, the optics means may comprise a lens element, such as a microlens, associated with said WDM port for spatially-shaping said WDM light beam.

The optics means may comprise, in combination, such a plurality of lens elements each for spatially-shaping a respective one of said plurality of light beams and such a lens element associated with the WDM port for spatially-shaping the WDM light beam, the total spatial-modification of a particular light beam, by refocusing light beam components whose wavelengths are at extremes of the range about the centre wavelengths and defocusing light beam components whose wavelengths are closer to the centre wavelengths, being provided cumulatively by the lens associated with the WDM port and the respective one of the plurality of lenses.

Each port may be the end of an optical waveguide, for example an optical fiber.

The or each microlens may comprise a cylindrical lens and may be spaced from the associated one of the ports by a distance about equal to the focal length of the microlens.

The numerical aperture of each optical element being approximately equal to the numerical aperture of the associated port, e.g. fiber or other waveguide, minimizes losses as the optical element focuses the light of slightly different wavelengths incident thereupon into the corresponding port/waveguide.

Where a lens element is provided adjacent an input port, a light beam entering the port and passing through the lens element will be preconditioned, i.e. its width reduced as aforesaid, to such an extent that, following dispersion and focusing, each of the output light beams is concentrated into the required groups of wavelengths and numerical aperture.

BRIEF DESCRIPTION OF THE DRAWINGS

Various features and advantages of the present invention will become apparent from the following description, taken in conjunction with the attached drawings, of preferred embodiments of the invention, which are described by way of example only.

FIG. 3 illustrates the ray tracings at the ends of the waveguides without the microlens array;

FIGS. 4A to 4D illustrate the spectral response characteristics of the demultiplexer without the microlens array;

FIG. 6 corresponds to FIG. 3 but illustrates the ray tracings at the ends of the waveguides with the microlens array interposed;

FIGS. 7A to 7D correspond to FIGS. 4A to 4D but illustrate the spectral response characteristics of the demultiplexer with the microlens array interposed;

DESCRIPTION OF THE PREFERRED EMBODIMENTS

Figure 1:
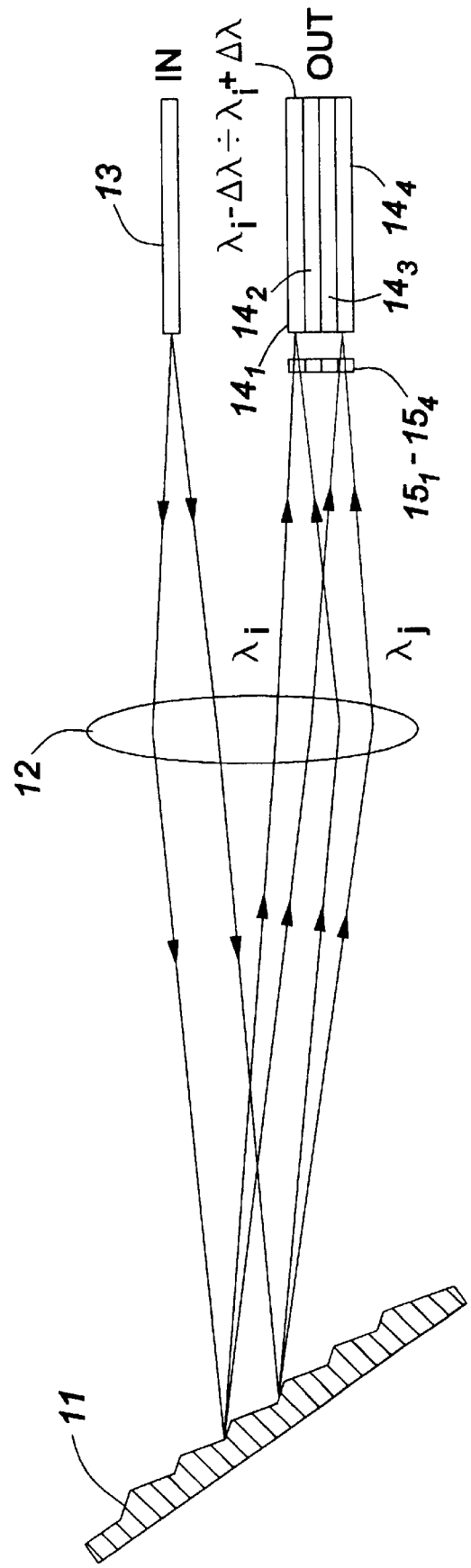
FIG. 1 is a simplified schematic diagram of a wavelength-division demultiplexer according to a first embodiment of the invention, comprising a microlens array interposed between a diffraction grating and an output waveguide array.
Figure 2:
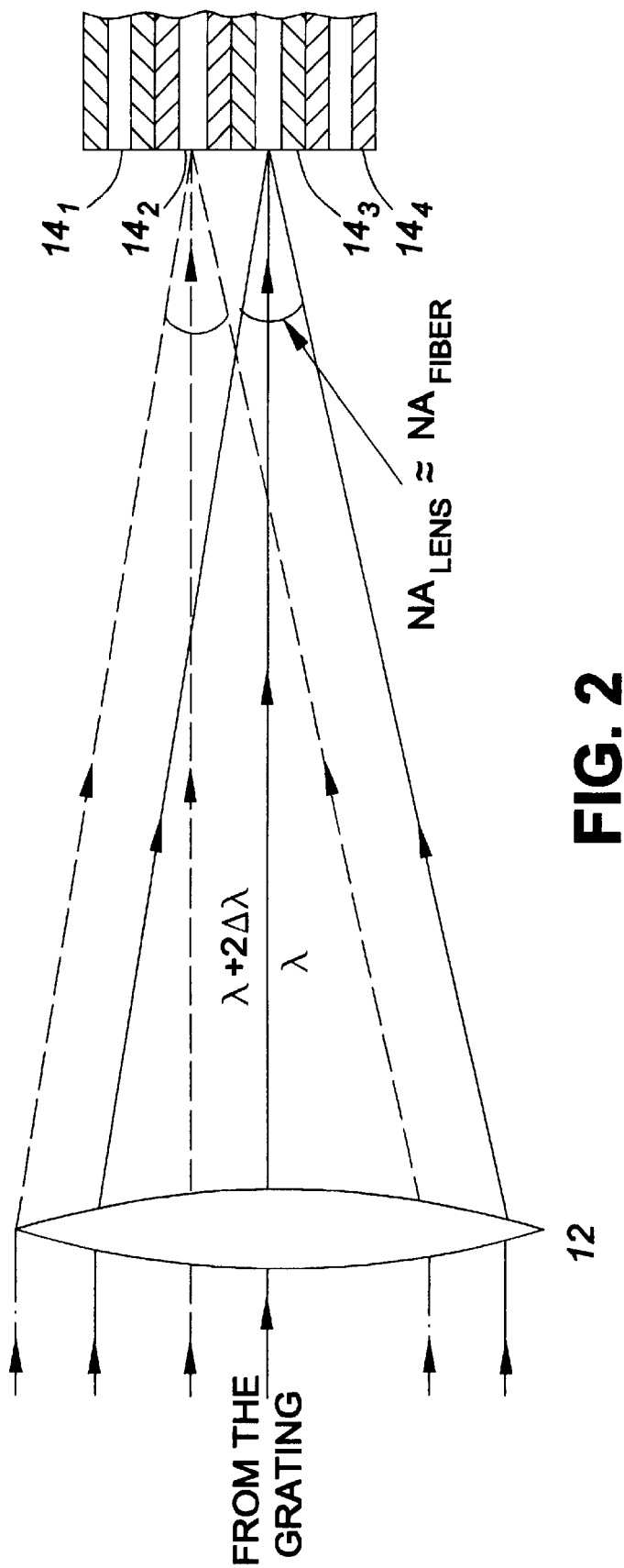
FIG. 2 is a detail view of a part of the demultiplexer showing the waveguide array but with the microlens array removed, and illustrates ray tracing of light beams having different wavelengths.

In the drawings, identical or corresponding components in the different figures have the same reference numeral.

For convenience, only a demultiplexer will be described in detail. It should be appreciated that the wavelength-division multiplexer is identical physically to the demultiplexer. The same device can be used for either multiplexing or demultiplexing simply by reversing the direction of the light beams traversing it.

Referring to FIG. 1, a demultiplexer embodying the present invention comprises an angular dispersion element in the form of a diffraction grating 11, a collimator lens 12, an input WDM port comprising the end of an optical waveguide 13, a plurality of output ports comprising the ends of an array of four output optical waveguides $14_1$–$14_4$ and spatially-shaping optics means in the form of an array of four microlenses $15_1$–$15_4$. In this specific embodiment, the waveguides 13 and $14_1$–$14_4$ are single mode optical fibres each having a core about 10 microns in diameter. The microlenses $15_{1-15_4}$ are each aligned with a corresponding one of the output waveguides $14_1$–$14_4$. By focusing the grating-diffracted light passing through it, each microlens modifies the spectral response of a corresponding channel.

A WDM light beam leaving the input port 13 passes through the lens 12 which collimates the WDM light beam before it is incident upon the diffraction grating 11. The WDM light beam comprises a plurality of wavelength-division multiplexed light beams having different centre wavelengths $\lambda_1$ to $\lambda_4$, respectively. Although, in communications systems, it is usual to have only one wavelength per channel, drifting can occur, so each light beam can comprise a group of wavelengths having a range $2\Delta\lambda$ dispersed about the centre wavelength designated as $\lambda_i$ (or $\lambda_j$), i.e. a range of $\lambda_i-\Delta\lambda \div \lambda_1+\Delta\lambda$. The diffraction grating 11 separates the WDM light beam into its constituent plurality of light beams, each of which leaves the diffraction grating 11 at a different one of a plurality of dispersion angles in a dispersion plane DP (see FIG. 4A). In FIG. 1, the dispersion plane is the plane of the drawing. The output waveguides $14_{1-144}$ are aligned in the dispersion plane. Following dispersion by the grating, the light beams pass through the collimating lens 12 again, in the opposite direction. The collimating lens 12 and microlenses $15_1$ to $15_4$ combine to focus each of the plurality of light beams towards the end of a corresponding one of the output waveguides $14_1-14_4$, the ends of which are located close to a focus of the lens 12.

Referring to FIGS. 2, 3 and 4A-4D, the demultiplexer components, without the microlens array $15_1-15_4$, are aligned to produce minimal losses at wavelengths $\lambda$, $\lambda+2\Delta\lambda$ etc. This is achieved when the numerical aperture aperture of the lens of the lens 12, $NA_{lens}$, matches the numerical aperture of the fiber 13, $NA_{fiber}$; i.e., $NA_{lens} \approx NA_{fiber}$. As illustrated in FIGS. 4A, 4B and 4C, the spatial distribution of intensity across each fiber exhibits a sharp peak. FIG. 4D illustrates the light distribution in the core of each single mode fiber, and shows that intensity with respect to wavelength also exhibits a sharp peak.

Figure 5:
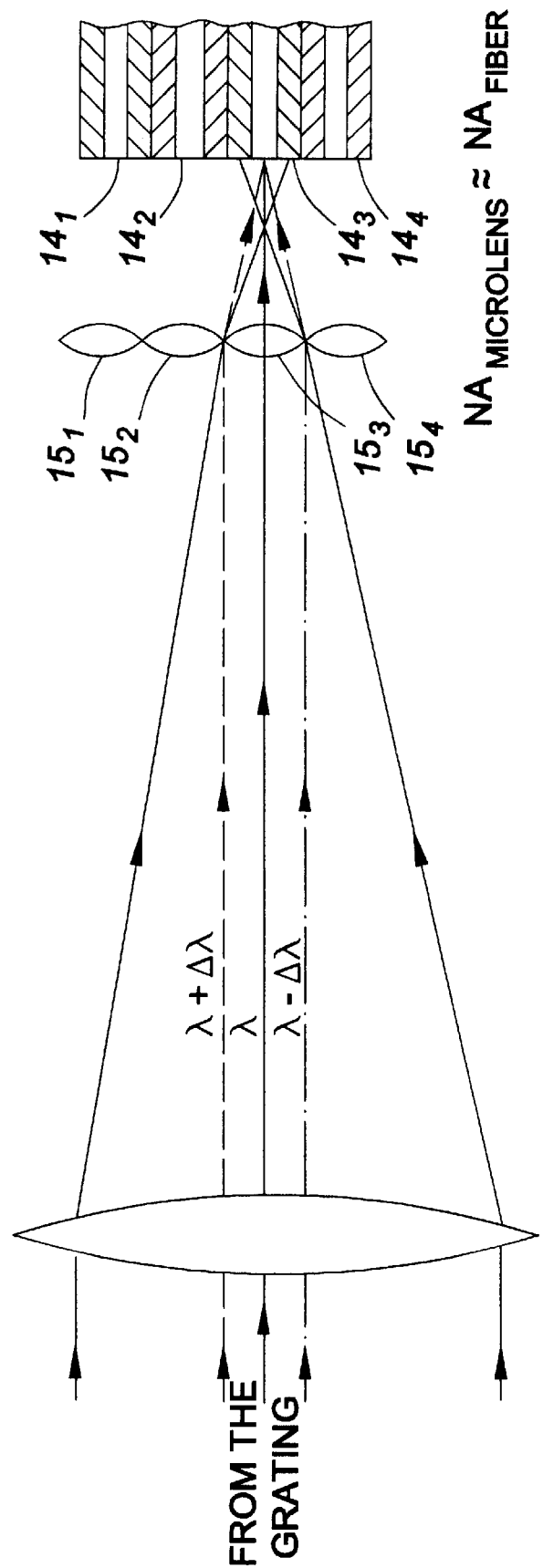
FIG. 5 is a detail view corresponding to FIG. 2 but with the microlens array interposed.

Referring to FIG. 5, once the initial alignment has been completed, the microlenses $15_1-15_4$ are interposed at a distance approximately equal to their focal length from the fibers $14_1-14_4$. Each microlens acts as a funnel, gathering light of different wavelengths in the range from $\lambda-\Delta\lambda$ to $\lambda+\Delta\lambda$ around the wavelengths $\lambda$ impinging upon it and focusing those wavelengths into the corresponding fiber of the array. Each of the microlenses $15_1-15_4$ is located close to the focus of the collimating lens 12, typically a few hundred microns away, so the different wavelengths to be funnelled are relatively well separated spectrally. The microlenses $15_1-15_4$ are cylindrical lenses, their cylindrical axes extending normal to the dispersion plane DP and in the direction y in FIG. 7C. Consequently, as can be seen from FIG. 7C, the intensity distribution in the direction y is substantially unchanged. In the direction x in the dispersion plane DP, however, the resulting spectral intensity for each channel is plateau-shaped, with a flat top and steep edges, assuming that the collecting aperture of each microlens is much larger than the diameter of the individual fiber (typically 10 microns for single mode fiber). The relative positions of the microlens array $15_1-15_4$, collimator lens 12 and the ends of fibers $14_1-14_4$ and 13 are optimized to obtain the required channel bandwidth as well as to minimize the losses. The position of the collimating lens 12 is also adjusted to take into account the finite thickness of the substrate on which the microlenses are held. In particular, the lens 12 is translated, depending on this thickness, a few hundred microns away from the fiber array. Alternatively, the fiber array and the microlens array can be translated about the same distance away from the collimating lens 12.

It should be appreciated that the line distribution of the light in the focal plane is not transformed into a discrete multitude of foci, but into a continuous line distribution of light rays whose convergence cones, i.e. numerical apertures (NA) are closely matched to the numerical apertures (NA) of the ports in such a way as to enable only rays within a specific range of wavelengths to enter the associated port. This corresponds to the numerical aperture of each of the microlens 15, ..., $15_5$, $NA_{microlens}$, matching the numerical aperture of the corresponding one of the fiber 13, $14_1, \ldots, 14_4$, $NA_{fiber}$; i.e., $NA_{microlens} \approx NA_{fiber}$. Each of the microlenses effectively increases the range of accepted wavelengths of the associated port by changing the ray angles, although at the expense of additional losses for the rays/wavelengths which were accepted before hand and now are spread out.

The requirements for the microlenses (focal length, diameter, type) are determined by the need to match the numerical aperture of each microlens closely with that of the associated fiber (for minimal losses) and by the channel separation and bandwidth. An example below shows a typical case.

The diffraction grating resolution R is given by the relationship:

$$R=\lambda/\delta\lambda=mN=D_{beam}\times\text{\#lines/mm}/\cos\theta=2NA\,f\times\text{\#lines/mm}/\cos\theta \quad (1)$$

where N is the number of illuminated grooves of the diffraction grating of order m placed at an angle $\theta$ and possessing certain # lines/mm, NA is the numerical aperture of the fiber and f is the focal length of lens 12. In order to be able to obtain a flat top channel response shape, the grating resolved bandwidth $\delta\lambda$ must be much less than the channel bandwidth. Thus, for a given diffraction grating, the focal length of the lens 12 has a minimal value below which the beam diameter is too small to utilize enough grooves of the grating for the required resolution. For a given diffraction grating and collimating lens focal length f, the bandwidth of each channel $\Delta\lambda$ is defined by the aperture $\Delta L$ of the collecting optics/fibers according to the expression:

$$\Delta\lambda=\Delta L/(f\times d\theta/d\lambda) \quad (2)$$

In order to minimize the losses, the numerical aperture of the collecting optics, i.e. of each microlens, should preferably be matched to that of the fiber, which imposes a dependence $$\Delta L=2NA\times f_{microlens} \quad (3)$$

where $\Delta L$ is the diameter of a microlens with a focal length $f_{microlens}$. As an example, for channel spacing of 1.6 nm and $\lambda=1550$ nm, the grating resolution R has to be about 10,000. For a typical grating of 600 l/mm ($\theta \cong 27°$) this results in a minimal focal length f$\cong$6 cm. In order to have channel spacing of 1.6 nm, and a corresponding maximum channel bandwidth of 1.6 nm, using the angular dispersion of the grating; $d\theta/d\lambda=0.677$ mrad/nm, from equation (2) the microlens should have a diameter (aperture) $\Delta L=65$ microns. This will correspond to the separation between the fibers in the array. Taking fiber NA=0.11, from equation (3) $f_{microlens}=$ 295 microns.

Because of light ray path reversibility, the device depicted in FIG. 1 can also be used as a multiplexer. Light of the appropriate wavelengths $\lambda_1-\lambda_4$ entering from the array of fibers $14_1-14_4$ will be directed through the optical system in the reverse direction and enter the fiber 13 as a wavelength-division-multiplexed light beam.

Figure 8:
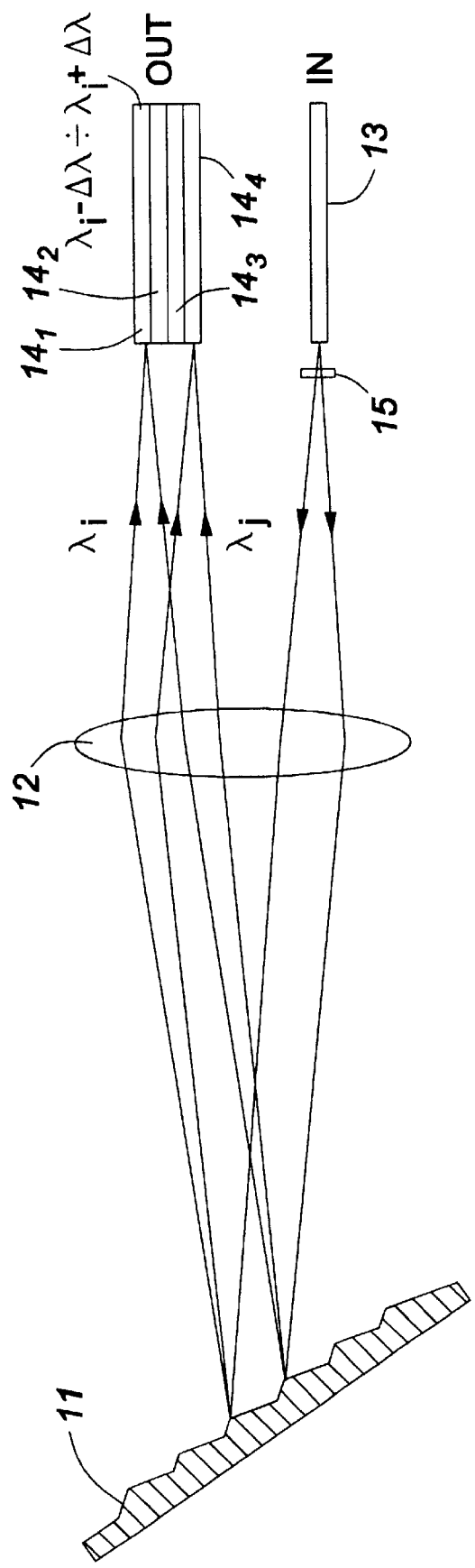
FIG. 8 is a simplified schematic diagram of a demultiplexer according to a second embodiment of the invention.

The demultiplexer of FIG. 1 may be modified, as shown in FIG. 8, by omitting the array of microlenses $15_1-15_4$ adjacent the ends of waveguides/fibers $14_1-14_4$ and inserting a single microlens 15 adjacent the end of fiber 13. With this arrangement, white light entering the device from fiber 13 is spatially-shaped by single microlens 15, passes through the collimator lens 12 and impinges upon the diffraction grating 11, which splits it into angularly-dispersed light beams $\lambda_1$–$\lambda_4$. The light beams pass through the collimator lens 12 in the opposite direction and each of the fibers 14$_1$–14$_4$ captures light in the bandwidth from $\lambda_i$–$\Delta\lambda_i$ to $\lambda_i$+$\Delta\lambda_i$.

This modified arrangement is easier to implement/manufacture because it requires the alignment of only one microlens and input optical waveguide, as opposed to the device of FIG. 1 which requires alignment of each element of the array of output waveguides with the corresponding one of the array of microlenses, which poses very stringent tolerance requirements upon the relative positions of those elements. The same modified version of the device may be used as a multiplexer by reversing the light ray direction.

Figure 9:
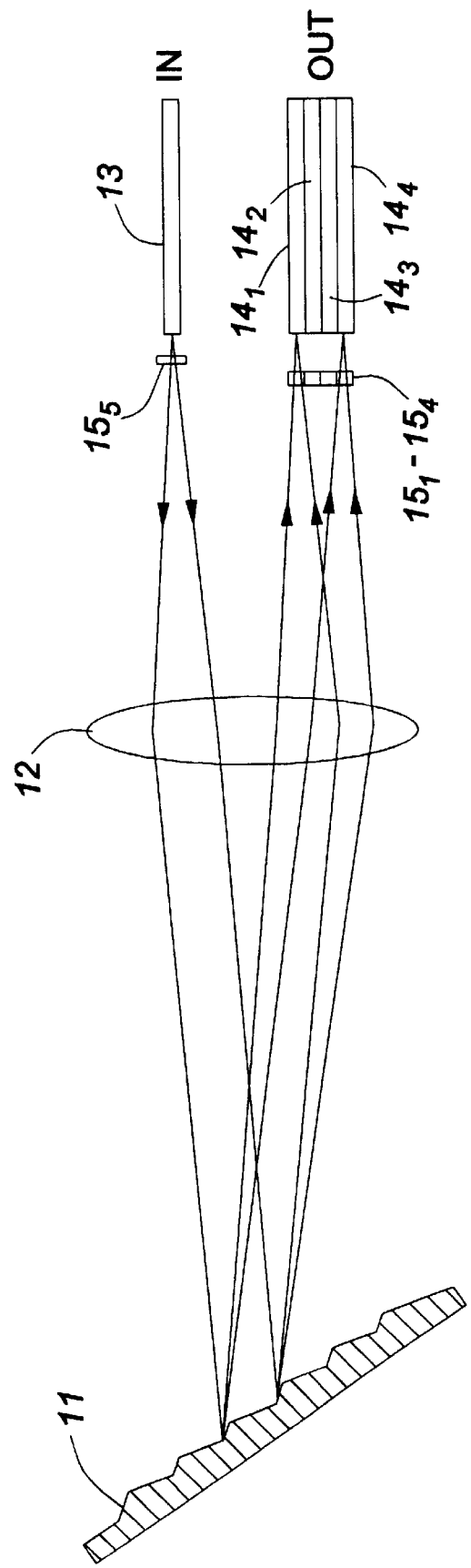
FIG. 9 is a simplified schematic diagram of a demultiplexer according to a third embodiment of the invention.

It is also envisaged that given the reversibility, a symmetrical multiplexer or demultiplexer could be produced which has a microlens adjacent each waveguide/fiber, both input and output, in essence combining the devices of FIGS. 1 and 8. FIG. 9 illustrates such a symmetrical device. In this case, in dispersion plane DP light from the fiber illuminates only a small part of the collimating lens 12. As the fiber array 14$_1$–14$_4$ is small compared with the diameter of lens 12 (say 1–2 mm vs. 1–2 cm), only the central portion of the lens will be utilized, resulting in smaller aberration, i.e. lower losses, as compared with a standard multiplexer/demultiplexer using only a grating and a single collimating lens. Moreover, a symmetrical configuration in optics tends to better match beam waists and numerical apertures, also leading to smaller losses.

It should be appreciated, however, that the small diameter of the beam at the lens 12 and at both input and output microlenses will result in small grating resolution R and relatively large diffraction, tending to produce a more gaussian-type spectral shape than the flat-topped spectral shape produced by the non-symmetrical devices of FIGS. 1 and 8.

A simplification of the device of FIG. 9 may be achieved by using a single microlens array to focus the light for both the input and output fibers.

The use of an array of cylindrical lenses with their axes perpendicular to the dispersion plane of the grating results in lower losses as the cylindrical lens does not change the original light beam convergence/focusing in the direction of the cylindrical lens axis. Moreover, the microlens alignment is required in only one of the two lateral dimensions. However, an array of spherical lenses, diffractive-type elements, and so on, could be used instead, providing they produce the required spatial-shaping.

Although the above-described embodiments use a plane diffraction grating and a collimating lens, the invention may also be implemented with a concave mirror instead of the collimating lens or with a concave grating which combines the functions of the diffraction grating and the collimating lens. Either a reflection grating or a transmission grating could be used, but the reflection types are preferred for higher efficiency and dispersion. Also, any other dispersive elements, such as prisms, etc., could be used instead of the diffraction grating. The array of fibers may be substituted by an array of other waveguides. For convenience of illustration, only four channels, i.e. four microlenses, four waveguides and four light beams have been depicted. In a practical embodiment, however, there could be many more, typically 8, 16, 32, 64 and so on.

Although the above-described embodiments are "free-space" devices, it is envisaged that the invention could be implemented in a waveguide grating based WDM device where one-dimensional or planar lenses can be used instead of the cylindrical lenses.

INDUSTRIAL APPLICABILITY

Embodiments of the present invention may advantageously be used in WDM optical communications systems to alleviate variations in losses as a result of signal wavelength changes.

What is claimed is:

1. A multiplexer device for multiplexing a plurality of light beams communicated via a corresponding plurality of ports to form a wavelength-division-multiplexed (WDM) light beam, each of said plurality of light beams comprising a distinct group of wavelengths, the groups having different centre wavelengths, comprising:

(i) angular dispersion means for combining a plurality of light beams incident thereupon each at a corresponding one of a plurality of dispersion angles to form a said WDM light beam in said optical path, (ii) a WDM port disposed in said optical path for receiving said WDM light beam from said angular dispersion means;

(iii) a plurality of ports disposed in said dispersion plane and so positioned relative to said angular dispersion means as to define a corresponding plurality of optical paths whereby said plurality of light beams from said angular dispersion means are received by said WDM port; and (iv) optics means for spatially-modifying said WDM light beam, or said WDM light beam and each of said plurality of light beams, or each of said plurality of light beams, by refocusing light beam components whose wavelengths are at extremes of the range about the centre wavelengths and defocusing light beam components whose wavelengths are closer to the centre wavelengths so as to achieve a spectral intensity across each port that is substantially flat.

2. A device according to claim 1, wherein the angular dispersion means comprises a diffraction grating and a focussing lens, the focussing lens disposed between the diffraction grating and the WDM port for focusing a WDM light beam leaving the diffraction grating onto the WDM port.

3. A device according to claim 1, wherein the optics means comprises a plurality of microlens elements each associated with a respective one of the plurality of ports and plurality of dispersion angles, each of said microlens elements for spatially-shaping a respective one of said plurality of light beams.

4. A device according to claim 2, wherein the optics means comprises a plurality of microlens elements each associated with a respective one of the plurality of ports and plurality of dispersion angles, each of said microlens elements for spatially-shaping a respective one of said plurality of light beams.

5. A device according to claim 1, wherein the optics means comprises a microlens element associated with said WDM port for spatially-shaping said WDM light beam.

6. A device according to claim 2, wherein the optics means comprises a microlens element associated with said WDM port for spatially-shaping said WDM light beam.

7. A device according to claim 1, wherein the optics means comprises a plurality of microlens elements each associated with a respective one of the plurality of ports and plurality of dispersion angles, each of said microlens elements for spatially-shaping a respective one of said plurality of light beams, and a microlens element associated with said WDM port for spatially-shaping said WDM light beam, the total spatial modification of a particular light beam to achieve said substantially flat spectral intensity being provided cumulatively by the lens associated with the WDM port and a respective one of the plurality of lenses.

8. A device according to claim 2, wherein the optics means comprises a plurality of microlens elements each associated with a respective one of the plurality of ports and plurality of dispersion angles, each of said microlens elements for spatially-shaping a respective one of said plurality of light beams, and a microlens element associated with said WDM port for spatially-shaping said WDM light beam, the total spatial modification of a particular light beam to achieve said substantially flat spectral intensity being provided cumulatively by the lens associated with the WDM port and a respective one of the plurality of lenses.

9. A device according to claim 1, wherein the angular dispersion means comprises a diffraction grating means and a collimating device.

10. A demultiplexer device for demultiplexing a wavelength-division-multiplexed (WDM) light beam to form a corresponding plurality of light beams, the demultiplexer comprising:
(i) angular dispersion means for dispersion means for dispersing a said WDM light beam incident thereupon along a predetermined optical path into said plurality of light beams, each at a corresponding one of a plurality of dispersion angles in a dispersion plane of the angular dispersion means,
(ii) a WDM port disposed in said optical path for communicating said WDM light beam to said angular dispersion means;
(iii) a plurality of ports disposed in said dispersion plane and so positioned relative to said angular dispersion mean as to define a corresponding plurality of optical paths for communicating said plurality of light beams from said angular dispersion means to respective ones of said plurality of ports; and
(iv) optics mean for spatially-modifying said WDM light beam, or said WDM light beam and each of said plurality of light beams, or each of said plurality of light beams, by refocusing light beam components whose wavelengths are a extremes of the range about the centre wavelengths and defocusing light beam components whose wavelengths are closer to the centre wavelengths so as to achieve a spectral intensity across each port that is substantially flat.

11. A device according to claim 10, wherein the angular dispersion means comprises a diffraction grating and a collimating lens, the collimating lens disposed between the diffraction grating and the WDM port for collimating light leaving the WDM port before the light is incident upon the diffraction grating.

12. A device according to claim 10, wherein the optics means comprises a plurality of microlens elements each associated with a respective one of the plurality of ports and plurality of dispersion angles, each of said microlens elements for spatially-shaping a respective one of said plurality of light beams.

13. A device according to claim 11, wherein the optics means comprises a plurality of microlens elements each associated with a respective one of the plurality of ports and plurality of dispersion angles, each of said microlens elements for spatially-shaping a respective one of said plurality of light beams.

14. A device according to claim 10, wherein the optics means comprises a microlens element associated with said WDM port for spatially-shaping said WDM light beam.

15. A device according to claim 11, wherein the optics means comprises a microlens element associated with said WDM port for spatially-shaping said WDM light beam.

16. A device according to claim 10, wherein the optics means comprises a plurality of microlens elements each associated with a respective one of the plurality of ports and plurality of dispersion angles, each of said microlens elements associated with said WDM port for spatially-shaping said WDM light beam, the total spatial modification of a particular light beam to achieve said substantially flat spectral intensity being provided cumulatively by the lens associated with the WDM port and a respective one of the plurality of lenses.

17. A advice according to claim 11, wherein the optics means comprises a plurality of microlens elements each associated with a respective one of the plurality of ports and plurality of dispersion angles, each of said microlens elements for spatially-shaping a respective one of said plurality of light beams, and a microlens element associated with said WDM port for spatially-shaping said WDM light beam, the total spatial modification of a particular light beam to achieve said substantially flat spectral intensity being provided cumulatively by the lens associated with the WDM port and a respective one of the plurality of lenses.

18. A device according to claim 10, wherein the angular dispersion means comprises a diffraction grating means and a collimating device.

\* \* \* \* \*